United States Patent
Song et al.

(10) Patent No.: US 12,347,195 B2
(45) Date of Patent: Jul. 1, 2025

(54) VIDEO TEXT PROCESSING METHOD, APPARATUS, AND COMPUTER-READABLE STORAGE MEDIUM

(71) Applicant: TENCENT TECHNOLOGY (SHENZHEN) COMPANY LIMITED, Guangdong (CN)

(72) Inventors: Hao Song, Shenzhen (CN); Shan Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 354 days.

(21) Appl. No.: 17/688,987

(22) Filed: Mar. 8, 2022

(65) Prior Publication Data

US 2022/0198800 A1 Jun. 23, 2022

Related U.S. Application Data

(63) Continuation of application No. PCT/CN2020/126832, filed on Nov. 5, 2020.

(30) Foreign Application Priority Data

Feb. 17, 2020 (CN) .......................... 202010096614.X

(51) Int. Cl.
*G06V 20/40* (2022.01)
*G06V 10/24* (2022.01)
(Continued)

(52) U.S. Cl.
CPC .............. *G06V 20/46* (2022.01); *G06V 10/24* (2022.01); *G06V 10/25* (2022.01); *G06V 10/761* (2022.01)

(58) Field of Classification Search
CPC ...... G06V 20/48; G06V 20/46; G06V 10/761; G06V 20/62; G06V 10/25; G06V 10/24
See application file for complete search history.

(56) References Cited

U.S. PATENT DOCUMENTS 6,243,419 B1 * 6/2001 Satou ..................... G06V 20/62
375/E7.077
7,787,705 B2 * 8/2010 Sun ....................... G06V 20/635
348/700
(Continued)

FOREIGN PATENT DOCUMENTS

CN 106454151 A 2/2017
CN 108495162 A 9/2018
(Continued)

OTHER PUBLICATIONS

First Office Action of Chinese Application No. 202010096614.X dated Jan. 27, 2021.
(Continued)

*Primary Examiner* — Kenny A Cese
(74) *Attorney, Agent, or Firm* — Banner & Witcoff, Ltd.

(57) ABSTRACT

A video processing method is provided. The method includes extracting at least two adjacent video frame images from a frame image sequence corresponding to a video, positioning a text region of each video frame image in the at least two adjacent video frame images, determining a degree of similarity between text regions of each video frame image in the at least two adjacent video frame images, determining, based on the degree of similarity, a key video frame segment comprising a same text in the video, and determining a text key frame in the video based on the key video frame segment.

15 Claims, 7 Drawing Sheets

(51) Int. Cl.
　　　*G06V 10/25* 　　　(2022.01)
　　　*G06V 10/74* 　　　(2022.01)

(56) References Cited

U.S. PATENT DOCUMENTS

| | | | |
|---|---|---|---|
| 11,138,440 B1* | 10/2021 | Wang | G06V 20/48 |
| 2011/0110592 A1* | 5/2011 | Wada | G06V 20/10 |
| | | | 382/182 |
| 2018/0082127 A1 | 3/2018 | Carlson et al. | |
| 2018/0210774 A1* | 7/2018 | Young | G06F 11/0751 |
| 2019/0034312 A1 | 1/2019 | Karunamoorthy et al. | |

FOREIGN PATENT DOCUMENTS

| | | |
|---|---|---|
| CN | 109803180 A | 5/2019 |
| CN | 110147745 A | 8/2019 |
| CN | 110399798 A | 11/2019 |
| CN | 111294646 A | 6/2020 |

OTHER PUBLICATIONS

Second Office Action of Chinese Application No. 202010096614.X dated Aug. 2, 2021.
Third Office Action of Chinese Application No. 202010096614.X dated Oct. 26, 2021.
International Search Report of PCT/CN2020/126832 dated Feb. 4, 2021 [PCT/ISA/210].
Written Opinion of PCT/CN2020/126832 dated Feb. 4, 2021 [PCT/ISA/237].

* cited by examiner

VIDEO TEXT PROCESSING METHOD, APPARATUS, AND COMPUTER-READABLE STORAGE MEDIUM

CROSS-REFERENCE TO RELATED APPLICATION(S)

This application is a continuation application of International Application No. PCT/CN2020/126832, filed on Nov. 5, 2020, which claims priority to Chinese Patent Application No. 202010096614.X, filed with the China National Intellectual Property Administration on Feb. 17, 2020, the entire contents of which are incorporated by reference herein.

FIELD

This disclosure relates generally to video processing technologies in the video field, and in particular, to a video processing method, apparatus, and device, and a computer-readable storage medium.

BACKGROUND

A video key frame is a video frame that may represent main information of a video. The information expressed by the video may be quickly determined by using the video key frame, so that processing is performed on the video.

Generally, similarities between video frames are usually compared during extraction of a video key frame from a video, and a video frame having a similarity less than a similarity threshold is used as the video key frame of the video. However, the comparison between the video frames is performed for an entire video frame image during the extraction of the video key frame. Therefore, in a case that scenes of the video frames in the video greatly change but text information remains unchanged, a relatively high repetition rate of the extracted video key frame is caused by same text information in the video key frame, resulting in relatively low accuracy of the extracted video key frame.

SUMMARY

Provided are a video processing method, apparatus, and device, and a computer-readable storage medium.

In accordance with an aspect of an example embodiment of the disclosure, a video processing method, performed by at least one processor, may include extracting at least two adjacent video frame images from a frame image sequence corresponding to a video, positioning a text region of each video frame image in the at least two adjacent video frame images, determining a degree of similarity between text regions of each video frame image in the at least two adjacent video frame images, determining, based on the degree of similarity, a key video frame segment comprising a same text in the video, and determining a text key frame in the video based on the key video frame segment.

In accordance with an aspect of an example embodiment of the disclosure, an apparatus may include at least one memory configured to store computer program code, and at least one processor configured to access said computer program code and operate as instructed by said computer program code, said computer program code including first extracting code configured to cause the at least one processor to extract at least two adjacent video frame images from a frame image sequence corresponding to a video, first positioning code configured to cause the at least one processor to position a text region of each video frame image in the at least two adjacent video frame images, first determining code configured to cause the at least one processor to determine a degree of similarity between text regions of each video frame image in the at least two adjacent video frame images, second determining code configured to cause the at least one processor to determine, based on the degree of similarity, a key video frame segment comprising a same text in the video, a key video frame segment comprising a same text in the video, and third determining code configured to cause the at least one processor to determine a text key frame in the video based on the key video frame segment.

In accordance with an aspect of an example embodiment of the disclosure, a non-transitory computer-readable storage medium may store computer instructions that, when executed by at least one processor, cause the at least one processor to extract at least two adjacent video frame images from a frame image sequence corresponding to a video, position a text region of each video frame image in the at least two adjacent video frame images, determine a degree of similarity between text regions of each video frame image in the at least two adjacent video frame images, determine, based on the degree of similarity, a key video frame segment comprising a same text in the video, and determine a text key frame in the video based on the key video frame segment.

An embodiment of this disclosure provides a video processing apparatus, including an extraction part, configured to extract an adjacent video frame from a frame sequence corresponding to a video, a positioning part, configured to position a text region of each video frame in the adjacent video frame, a similarity degree part, configured to determine a similarity degree between the text regions of the each video frame in the adjacent video frame; and a key frame part, configured to determine, according to the similarity degree, a key video frame segment comprising a same text in the video frame image, the key frame part being further configured to determine a text key frame in the video based on the key video frame segment.

An embodiment of this disclosure provides a video processing device, including a memory, configured to store executable instructions, and a processor, configured to implement, when executing the executable instructions stored in the memory, the video processing method provided in the embodiments of this disclosure.

An embodiment of this disclosure provides a computer-readable storage medium, storing executable instructions, configured to cause a processor to implement the video processing method provided in the embodiments of this disclosure during execution.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

Figure 1:
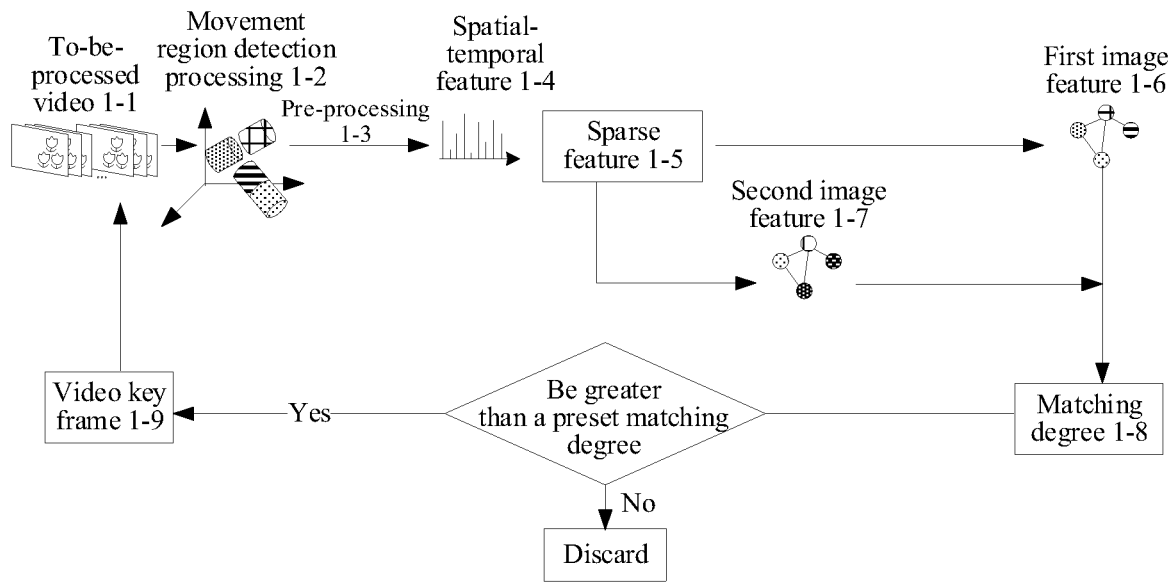
FIG. 1 is a flowchart of an example of obtaining a video key frame, according to an embodiment.

To make objectives, technical solutions, and advantages of this disclosure clearer, the following further describes this disclosure in detail with reference to the accompanying drawings. The described embodiments are not to be constructed as a limitation to this disclosure. All other embodiments obtained by a person of ordinary skill in the art without creative efforts shall fall within the protection scope of this disclosure.

In the following descriptions, involved "some embodiments" describe a subset of all possible embodiments. However, it may be understood that the "some embodiments" may be the same subset or different subsets of all the possible embodiments, and may be combined with each other without conflict.

In the following descriptions, the involved term "first/second" is merely intended to distinguish similar objects but does not necessarily indicate a specific order of an object. It may be understood that "first/second" is interchangeable in terms of a specific order or sequence if permitted, so that the embodiments of this disclosure described herein may be implemented in a sequence in addition to the sequence shown or described herein.

Unless otherwise defined, meanings of all technical and scientific terms used in the embodiments of this disclosure are the same as those usually understood by a person skilled in the art to which this disclosure belongs. Terms used in the embodiments of this disclosure are merely intended to describe objectives of the embodiments of this disclosure, but are not intended to limit this disclosure.

Before the embodiments of this disclosure are further described in detail, terms involved in the embodiments of this disclosure are described. The terms provided in the embodiments of this disclosure are applicable to the following explanations.

1) Artificial intelligence (AI) is a theory, method, technology, and application system that uses a digital computer or a machine controlled by the digital computer to simulate, extend, and expand human intelligence, perceive an environment, acquire knowledge, and use the knowledge to obtain an optimal result.

2) Machine learning (ML) is a multi-field interdiscipline, and relates to a plurality of disciplines such as the probability theory, statistics, the approximation theory, convex analysis, and the algorithm complexity theory. ML specializes in studying how a computer simulates or implements a human learning behavior, to obtain new knowledge or skills, and reorganize an existing knowledge structure, so as to keep improving performance of the computer. ML is the core of AI, is a basic way to make the computer intelligent, and is applied to various fields of AI. ML usually includes technologies such as an artificial neural network, a belief network, reinforcement learning, transfer learning, and inductive learning.

3) The artificial neural network is a mathematical model that imitates a structure and functions of a biological neural network. In this specification, exemplary structures of the artificial neural network include a deep neural network (DNN), a convolutional neural network (CNN), and a recurrent neural network (RNN), and the like. A neural network layer inside the DNN may be divided into three categories: an input layer, a hidden layer, and an output layer. The layers are fully-connected to each other, that is, any neuron on an $n^{th}$ (n is a positive integer greater than 0) layer needs to be connected to any neuron on an (n+1)th layer. In the field of information recommendation, interests of a user may be properly predicted or derived, to improve content diversity.

4) A loss function is also referred to as a cost function, and is a function that maps a value of a random event or a related random variable thereof to a non-negative real number to indicate a "risk" or "loss" of the random event.

5) A video key frame is a key image frame used for describing a video shot and is capable of reflecting main content of the video shot. A text key frame is a type of the video key frame.

6) Optical character recognition (OCR) refers to a process in which an electronic device (such as a scanner or a digital camera) checks a character on an image, determines a shape of the character by detecting the brightness or darkness mode, and translates the shape into a computer text by using a character recognition method.

AI is a comprehensive technology of computer science and attempts to understand the essence of intelligence and produce a new intelligent machine that may react in a way similar to human intelligence. AI is to study design principles and implementation methods of various intelligent machines, so that the machines have the functions of perception, reasoning, and decision-making.

In addition, the AI technology is a comprehensive discipline, covering a wide range of fields including both hardware-level technologies and software-level technologies. The basic AI technology generally includes technologies such as sensors, dedicated AI chips, cloud computing, distributed storage, big data processing technologies, operating/interaction systems, and mechatronics. AI software technologies mainly include a computer vision technology, a speech processing technology, a natural language processing technology, ML/deep learning, and the like.

With the research and progress of AI technologies, the AI technology has been researched and applied in many fields, such as a common smart home, a smart wearable device, a virtual assistant, a smart speaker, smart marketing, unmanned driving, automatic driving, an unmanned aerial vehicle, a robot, smart medical care, and smart customer service. With the development of technologies, the AI technology will be applied in more fields and play an increasingly important role. For example, AI may be further applied to the field of video processing. The application of AI in the field of video processing is described below.

A video key frame detection technology refers to a process of selecting a small quantity of video frames or video segments in a video to represent the video. The video is processed by using the video key frame detection technology, so that efficiency of obtaining corresponding meaning of the video is improved. Therefore, with an increasing quantity of videos on the Internet, the video key frame detection technology has been widely used. Generally, ML is generally used for implementation when a video key frame in a video is obtained by using the video key frame detection technology.

For example, a video frame/video segment is selected from a video in a processing manner of subset selection, that is, an optimal solution of the video is learned by using a submodular optimization algorithm, to obtain a video key frame. Alternatively, a video key frame in a video is detected by using an eye gaze tracking technology, and correlation and diversity of the obtained video key frame are improved by using a submodular optimization algorithm.

FIG. 1 is a flowchart of an example of obtaining a video key frame, according to an embodiment. FIG. 1 shows a process in which correlation of a video key frame is improved by using dictionary learning and sparse coding, and the video key frame is extracted according to a local movement region and the correlation of the video key frame. First, a video 1-1 is inputted, movement region detection processing 1-2 is performed on the video 1-1, and preprocessing 1-3 is performed on a movement region detection result, to obtain a spatial-temporal feature 1-4; then the spatial-temporal feature 1-4 is sparsely represented to obtain a sparse feature 1-5, a first image feature 1-6 corresponding to the sparse feature 1-5 is obtained, and a second image feature 1-7 of the sparse feature 1-5 is obtained by using a dictionary; and finally, the first image feature 1-6 matches the second image feature 1-7 to obtain a matching degree 1-8, and a corresponding video frame/video segment is outputted in a case that the matching degree 1-8 is greater than a preset matching degree, or a corresponding video frame is discarded in a case that the matching degree is less than or equal to a preset matching degree. In this case, a video key frame 1-9 corresponding to the video 1-1 is obtained.

Figure 2:
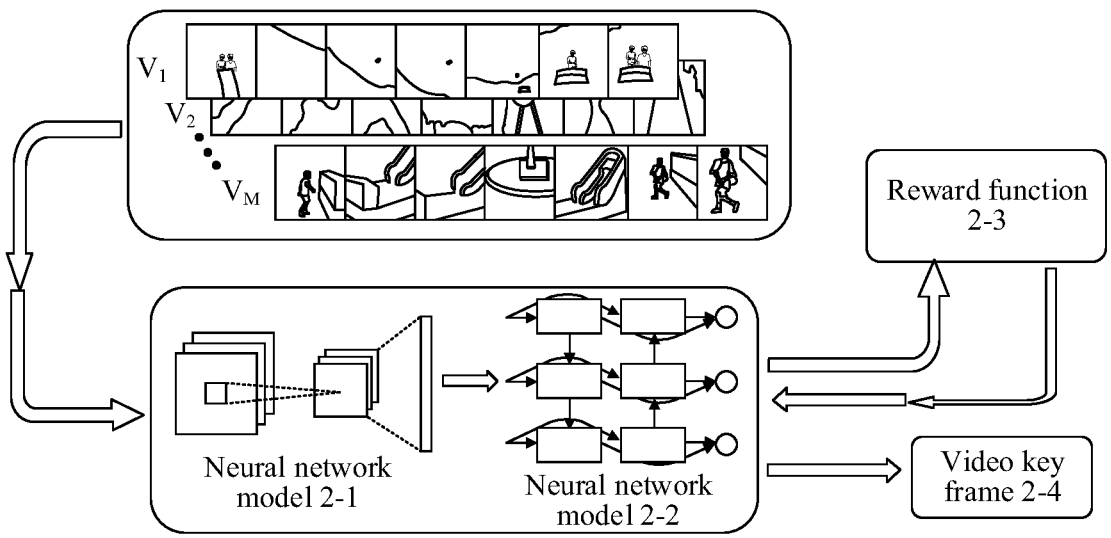
FIG. 2 is a flowchart of an example of obtaining a video key frame, according to an embodiment.

FIG. 2 is a flowchart of an example of obtaining a video key frame, according to an embodiment. In still another example, a video key frame is obtained based on a deep learning technology. FIG. 2 shows a process in which detection of supervised and unsupervised video key frames is implemented by using a policy of reinforcement learning and a reward function for setting diversity and expressiveness of the video key frame. First, a video is decoded into a plurality of video sequence sets $V_1$ to $V_m$ (where m is a positive integer greater than 0), feature extraction is performed on the plurality of video sequence sets $V_1$ to $V_m$ by using a neural network model 2-1 and a neural network model 2-2, an extracted feature is processed to obtain a reward function 2-3 related to the diversity and expressiveness of the video key frame, and a video key frame 2-4 is obtained according to the reward function and the extracted feature.

Figure 3:
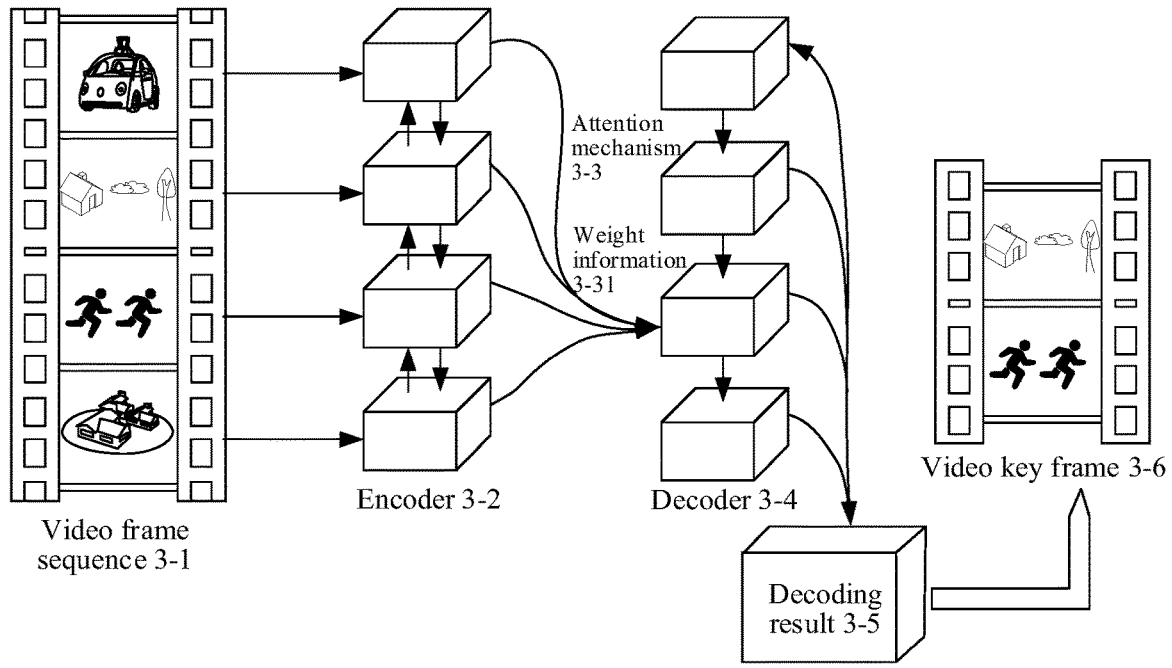
FIG. 3 is a flowchart of an example of obtaining a video key frame, according to an embodiment.

FIG. 3 is a flowchart of an example of obtaining a video key frame, according to an embodiment. In yet another example, a video key frame of a video is determined by using a sequence to sequence technology. FIG. 3 shows a process of obtaining the video key frame by using an encoding and decoding network constructed based on an attention mechanism. A video frame sequence 3-1 corresponding to a video is inputted into an encoder 3-2, and is decoded in a decoder 3-4 by using weight information 3-31 determined by an attention mechanism 3-3 and an encoding result of the encoder 3-2, and a video key frame 3-6 is obtained according to a decoding result 3-5. Alternatively, a long short-term memory network and determinantal point processes are used based on a policy of supervised learning, to automatically detect a video key frame of a video. Alternatively, an expansion timing unit of a video is reconstructed by using a generative adversarial network and a long short-term memory network, and detection of a video key frame of the video is implemented by using a reconstruction error.

Figure 4:
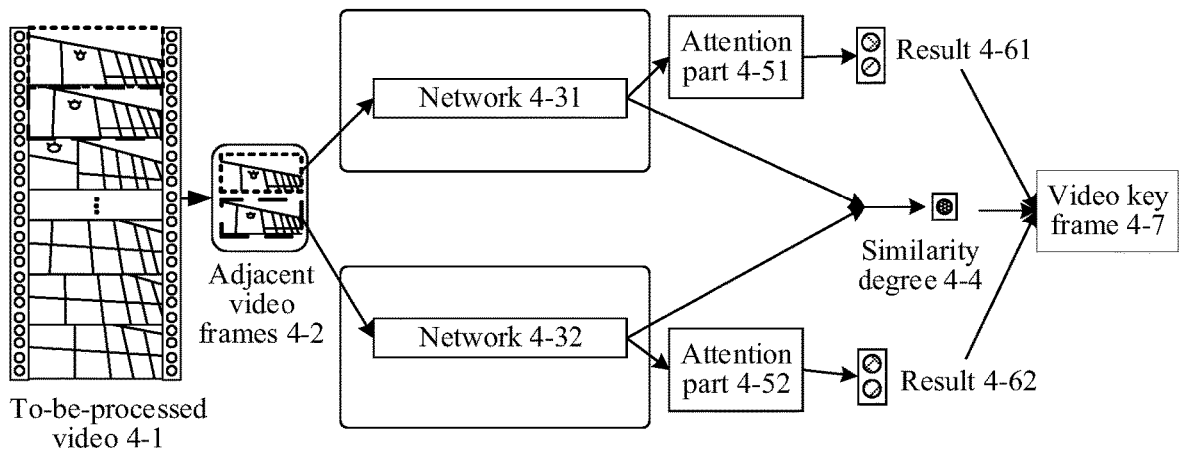
FIG. 4 is a flowchart of an example of obtaining a video key frame, according to an embodiment.

FIG. 4 is a flowchart of an example of obtaining a video key frame, according to an embodiment. Text information of the video is used as a factor of extracting the video key frame. FIG. 4 shows a process of detecting the video key frame based on a text siamese network. Adjacent video frames 4-2 of a video 4-1 are obtained, a similarity degree 4-4 between the adjacent video frames 4-2 is calculated by using the text siamese network (a network 4-31 and a network 4-32), whether there is text information in the video frames is determined by using an attention part 4-51 and an attention part 4-52, to separately obtain a result 4-61 and a result 4-62, and a video key frame 4-7 is further obtained according to the similarity degree 4-4 and the results (the result 4-61 and the result 4-62) indicating whether there is the text information.

However, text-based video key frames in the video cannot be detected based on the foregoing described technical solutions of obtaining the video key frame. In addition, although it is mentioned in FIG. 4 that the text information in the video is used as a factor of extracting the video key frame, the similarity degree comparison is performed for an entire video frame image during detection of the video key frame. Therefore, for a case that scenes of the video frames in the video greatly change but texts remains unchanged, a relatively high repetition rate of the video key frame is caused by a relatively high text repetition rate in the extracted video key frame, resulting in relatively low accuracy of the extracted video key frame.

In view of this, the embodiments of this disclosure provide a video processing method, apparatus, and device, and a computer-readable storage medium, to improve accuracy of the extracted video key frame. An exemplary application of a video processing device provided in the embodiments of this disclosure is described below. The video processing device provided in the embodiments of this disclosure may be implemented as various types of user terminals such as a smartphone, a tablet computer, and a notebook computer, or may be implemented as a server. An exemplary application of implementing the video processing device as the server is described below.

The embodiments of the disclosure have the following beneficial effects: Because a similarity degree of the adjacent video frame used for determining the text key frame is obtained with reference to the text regions of the video frames, the similarity degree reflects a similarity of the adjacent video frame on text information; and further, video key frames having different text information may be then accurately obtained with reference to the similarity degree and the text regions. As a result, a repetition rate of text information in the extracted text key frame is relatively low, but accuracy of the text key frame is relatively high, thereby improving accuracy of the video key frames.

Figure 5:
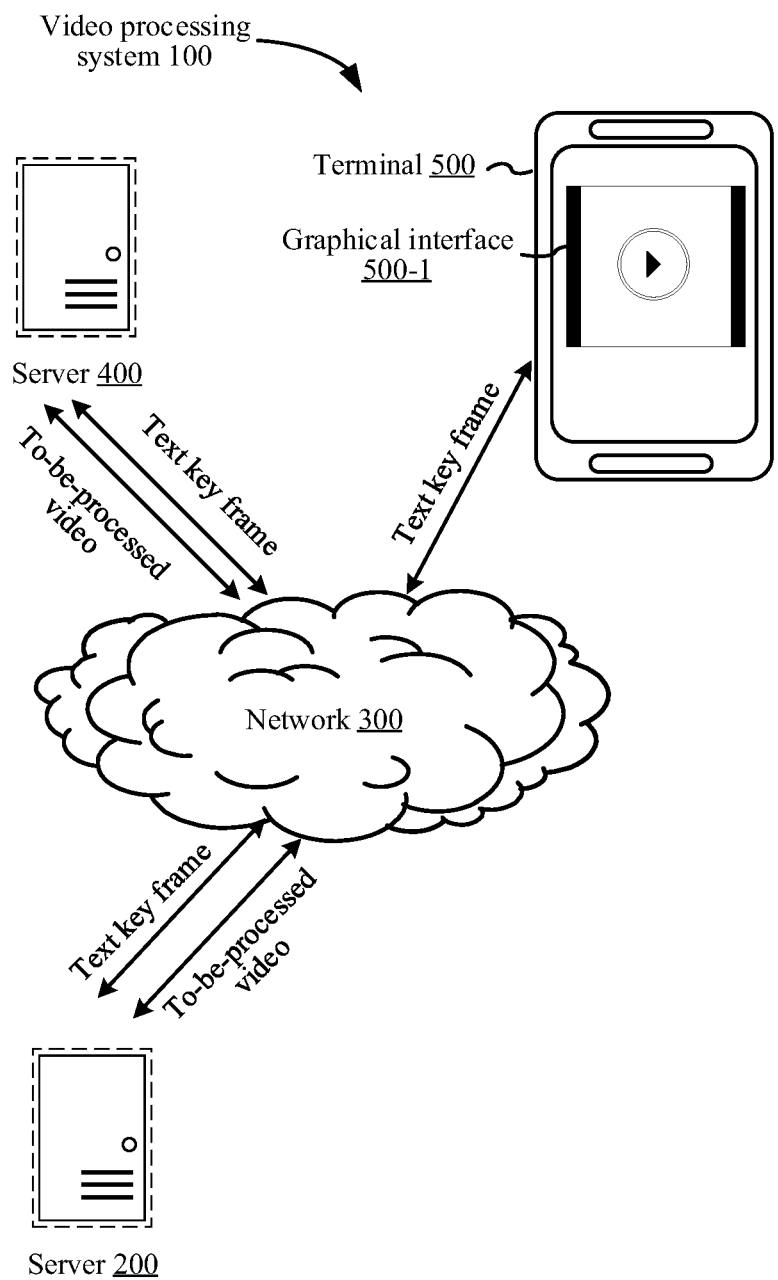
FIG. 5 is a diagram of a video processing system according to an embodiment.

FIG. 5 is a diagram of a video processing system according to an embodiment. To support a video processing application, in the video processing system 100, a server 400 is connected to a server 200 through a network 300. The network 300 may be a wide area network, a local area network, or a combination of the two. In addition, the video processing system 100 further includes a terminal 500. The terminal is connected to the server 200 through the network 300, receives, through the network 300, a text key frame transmitted by the server 200, and displays the text key frame in a graphical interface 500-1.

The server 200 is configured to provide a video to the server 400 through the network 300, and obtain a text key frame of the video from the server 400 through the network 300. The server is further configured to transmit the text key frame to the terminal 500 through the network 300.

The server 400 is configured to obtain the video from the server 200 through the network 300; extract an adjacent video frame from a frame sequence corresponding to the video; position a text region of each video frame in the adjacent video frame; determine a similarity degree between the text regions of the each video frame in the adjacent video frame; determine, according to the similarity degree, a key video frame segment including a same text in the video; determine a text key frame in the video based on the key video frame segment; and transmit the text key frame to the server 200 through the network 300.

In addition, the video processing device provided in the embodiments of this disclosure may be the server 400, or a combination of the server 200 and the server 400.

Figure 6:
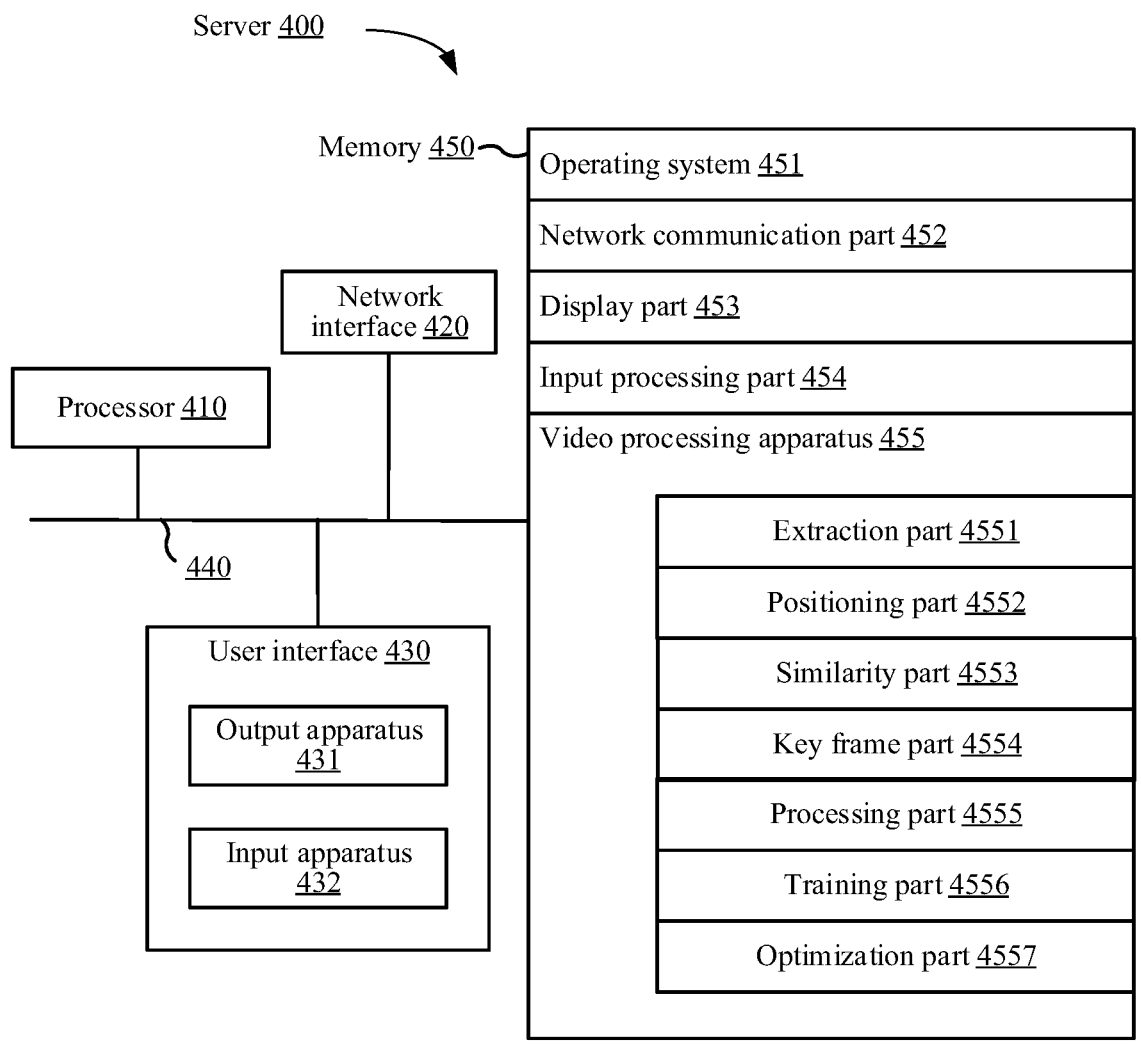
FIG. 6 is a diagram of a server shown in FIG. 5 according to an embodiment.

FIG. 6 is a diagram of a server shown in FIG. 5 according to an embodiment. The server 400 shown in FIG. 6 includes: at least one processor 410, a memory 450, at least one network interface 420, and a user interface 430. Various components in the server 400 are coupled together through a bus system 440. It may be understood that the bus system 440 is configured to implement connection and communication between the components. In addition to a data bus, the bus system 440 further includes a power bus, a control bus, and a status signal bus. However, for ease of clear description, all types of buses in FIG. 6 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or more output apparatuses 431 that enable presentation of media content, including one or more speakers and/or one or more visual display screens. The user interface 430 further includes one or more input apparatuses 432, including user interface components helping a user input, such as a keyboard, a mouse, a microphone, a touch display screen, a camera, and other input buttons and controls.

The memory 450 includes a volatile memory or a non-volatile memory, or may include both a volatile memory and a non-volatile memory. The non-volatile memory may be a read-only memory (ROM), and the volatile memory may be a random access memory (RAM). The memory 450 described in this embodiment is to include any other suitable type of memories. The memory 450 optionally includes one or more storage devices physically away from the processor 410.

In some embodiments, the memory 450 may store data to support various operations. Examples of the data include programs, modules, and data structures, or a subset or a superset thereof. The description is made below by using examples.

An operating system 451 includes a system program configured to process various basic system services and perform a hardware-related task, for example, a framework layer, a core library layer, and a driver layer, and is configured to implement various basic services and process a hardware-related task.

A network communication part 452 is configured to reach another computing device through one or more (wired or wireless) network interfaces 420. Exemplary network interfaces 420 include: Bluetooth, wireless compatible authentication (Wi-Fi), a universal serial bus (USB), and the like.

A display part 453 is configured to display information by using an output apparatus 431 (for example, a display screen or a speaker) associated with one or more user interfaces 430 (for example, a user interface configured to operate a peripheral device and display content and information).

An input processing part 454 is configured to detect one or more user inputs or interactions from one of the one or more input apparatuses 432 and translate the detected input or interaction.

In some embodiments, the video processing apparatus provided in the embodiments of this disclosure may be implemented by using software. FIG. 6 shows a video processing apparatus 455 stored in the memory 450. The video processing apparatus may be software in a form such as a program and a plug-in, and includes the following software parts: an extraction part 4551, a positioning part 4552, a similarity degree part 4553, a key frame part 4554, a positioning part 4555, a training part 4556, and an optimization part 4557. A function of each part will be described below.

In some other embodiments, the video processing apparatus provided in the embodiments of the application may be implemented by using hardware. For example, the video processing apparatus provided in the embodiments of the application may be a processor in a form of a hardware decoding processor, programmed to perform the video processing method provided in the embodiments of the application. For example, the processor in the form of a hardware decoding processor may use one or more application-specific integrated circuits (ASICs), a DSP, a PLD, a complex programmable logic device (CPLD), a field-programmable gate array (FPGA), or other electronic components.

The video processing method provided in the embodiments of the application is described with reference to an exemplary application and implementation of the server provided in this embodiment of the application.

Figure 7A:
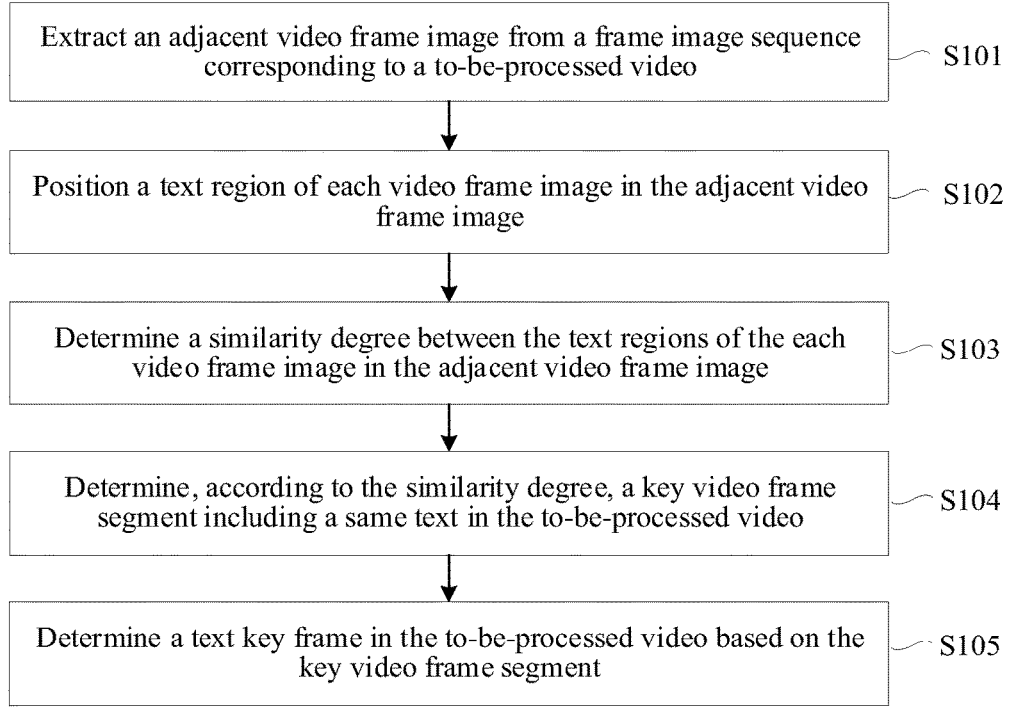
FIG. 7a is a flowchart of a video processing method according to an embodiment.

FIG. 7a is a flowchart of a video processing method according to an embodiment, which is described with reference to steps shown in FIG. 7a.

In operation S101, the system extracts an adjacent video frame image from a frame image sequence corresponding to a video.

In this embodiment of this disclosure, a corresponding processing object is the video in a case that the video processing device obtains a video key frame through video processing. Because the video is formed by a plurality of video frame images in a predetermined sequence, the video processing device may obtain a frame image sequence corresponding to the video. In this case, the video processing device extracts an adjacent video frame image from the frame image sequence corresponding to the video when selecting two adjacent video frame images from the frame image sequence corresponding to the video to perform combination.

Being adjacent refers to that the video frame images in the video are adjacent in a predetermined playback sequence. In addition, the adjacent video frame image may further include at least three adjacent video frame images. The embodiments of this disclosure are not specifically thereto.

In operation S102, the system positions a text region of each video frame image in the adjacent video frame image.

In this embodiment, the video processing device positions a text region of each video frame image in the adjacent video frame image, that is, positions the text region of each video frame image in the adjacent video frame image.

The text region of the each video frame image in the adjacent video frame image refers to a region including a text in the each video frame image.

In operation S103, the system determines a similarity degree between the text regions of the each video frame image in the adjacent video frame image.

In this embodiment, after obtaining the text region of the each video frame image in the adjacent video frame image, the video processing device perform comparison between the text regions of the each video frame image in the adjacent video frame image, to obtain a similarity degree between the text regions of the each video frame image in the adjacent video frame image.

The similarity degree represents a metric value of the similarity between the video frame images of the adjacent video frame image determined based on the text regions, and a relationship between the similarity degree and the similarity may be in a positive correlation, or in a negative correlation. The embodiments of this disclosure are not specifically limited thereto.

In operation S104, the system determines, according to the similarity degree, a key video frame segment including a same text in the video.

In this embodiment, because the similarity degree represents the metric value of the similarity between the video frame images of the adjacent video frame image determined based on the text regions, the video processing device compares the similarity degree with a preset similarity degree, to determine according to a comparison result whether the video frame images of the adjacent video frame image are similar to each other based on the text regions. Being similar indicates that the video frame images of the adjacent video frame image include the same text, and the adjacent video frames including the same text form a key video frame segment.

If there is a same video frame image between two adjacent video frame images, the two adjacent video frame images jointly form a key video frame segment; and if there is no same video frame image between the two adjacent video frame images, the two adjacent video frame images are two key video frame segments. In other words, the video frame images include the same text in one key video frame segment.

In operation S105, the system determines a text key frame in the video based on the key video frame segment.

In this embodiment, after the video processing device obtains the key video frame segment, because each adjacent video frame image in the key video frame segment includes the same text, a video frame corresponding to any video frame image is extracted from the adjacent video frame image including the same text, and the obtained video frame corresponding to the any video frame image is combined, to obtain a text key frame.

The video processing device may directly use a combination result of the obtained video frame corresponding to the any video frame image as the text key frame, or may obtain the text key frame with reference to a combination result of the obtained video frame corresponding to the any video frame image, the text region of the each video frame image in the adjacent video frame image, and the similarity degree between the text regions of the each video frame image in the adjacent video frame image.

The text key frame is a video frame having different text information in the video, and is used for processing the video based on the text information. Therefore, after the text key frame of the video is obtained, the video may be processed based on the text information by using the text key frame, for example, is processed by using an OCR technology, a video text audit system, and a video text understanding system.

It may be understood that, the video processing device positions text block position information (text regions) of the video frame images in the video, and determines a similarity between the adjacent video frame images in the video with reference to the text block position information, so that the technical solution of accurately and effectively obtaining the video key frame (text key frame) of the video is implemented, and the accuracy of the video key frame is improved.

In this embodiment, operation S101 may be implemented through operations S1011 and S1012 (not depicted). In other words, the operation of extracting, by a video processing device, an adjacent video frame image from a frame image sequence corresponding to a video includes operations S1011 and S1012, and the description is made below with reference to the operation.

In operation S1011, the system decodes the video, to obtain a frame image sequence.

In this embodiment, the video processing device decodes the video by using a video frame as a unit, to obtain a frame image sequence formed by images corresponding to a plurality of video frames in a predetermined sequence.

For example, the video processing device decodes the video into continuous video frames by using fast forward mpeg (ffmpeg, which is a multimedia video processing tool), and the images corresponding to the continuous video frames form the frame image sequence.

In operation S1012, the system obtains a current video frame image and a next video frame image in the frame image sequence, to obtain an adjacent video frame image.

In this embodiment of this disclosure, the video processing device, starting from a first video frame image of the frame image sequence, uses the first video frame image as a current video frame image, and selects a second video frame image as a next video frame image. In this case, an adjacent video frame image formed by the first video frame image and the second video frame image is obtained. Then, the video processing device uses the second video frame image as a current video frame image, and selects a third video frame image as a next video frame image. In this case, an adjacent video frame image formed by the second video frame image and the third video frame image is obtained. In this way, a subsequent video frame image is sequentially selected from the frame image sequence as a current video frame image, a next video frame image of the current video frame image is selected from the frame image sequence, an adjacent video frame image is further formed by the current video frame image and the next video frame image, and the obtaining of the adjacent video frame images is ended until a current video frame image is a penultimate video frame image in the frame image sequence and a next video frame image is a last video frame image.

In other words, the video frame images of the video are arranged in a predetermined sequence, the last video frame image is a video frame image corresponding to the last one in the predetermined sequence, and the video frame that is stated to be obtained is started from a video frame image corresponding to the first one in the predetermined sequence.

The current video frame image is any video frame image except the last video frame image in the frame image sequence, and the next video frame image is a following video frame image adjacent to the current video frame image in the frame image sequence.

In addition, the video processing device may alternatively select adjacent video frame images from the frame image sequence in other selection manners, to form an adjacent video frame image. The embodiments of this disclosure are not specifically limited thereto.

In this embodiment of this disclosure, operation S102 may be implemented through operations S1021 to S1024 (not depicted). In other words, the operation of positioning, by the video processing device, a text region of each video frame image in the adjacent video frame image includes operations S1021 to S1024, and the operations are separately described below.

In operation S1021, the system obtains an initial feature of each video frame image in the adjacent video frame image.

In this embodiment, the video processing device is intended to obtain video frames having different texts in the video when obtaining the video key frame of the video. Therefore, the video processing device first obtains an overall feature, that is, an initial feature, of the each video frame image in the adjacent video frame image, to position text regions according to the initial feature.

The initial feature herein is overall feature information of the video frame images. That is, the video processing device performs feature extraction on an entire region of the video frame images, to obtain the initial feature.

In operation S1022, the system obtains a text mask feature of the initial feature.

In this embodiment, after obtaining the initial feature, the video processing device detects a feature of a text position region of each video frame image in the adjacent video frame image from the initial feature, to obtain a text mask feature respectively corresponding to the each video frame image in the adjacent video frame image. In other words, the text mask feature is a feature of the text position region in the video frame image.

In operation S1023, the system calculates a text inclusion value of each video frame image in the adjacent video frame image according to the text mask feature.

In this embodiment, after the video processing device obtains the text mask feature, because the text mask feature represents a feature corresponding to a region including text information in the video frame image, a metric value, that is, a text inclusion value indicating whether the region corresponding to the video frame image includes the text information may be calculated according to the text mask feature.

In operation S1024, the system determines a text region of the each video frame image in the adjacent video frame image according to the text mask feature in a case that all the text inclusion values corresponding to the adjacent video frame image are greater than a preset inclusion value.

The preset inclusion value is set for the video processing device and represents a minimum value for determining that the text region is included. Therefore, after the video processing device obtains the text inclusion value of the adjacent video frame image, in a case that all the text inclusion value of each video frame image in the adjacent video frame image is greater than the preset inclusion value, it indicates that the each video frame image in the adjacent video frame image includes the text region; and the text region of the each video frame image in the adjacent video frame image is determined based on the corresponding text mask feature.

In this embodiment, operation S103 may be implemented through operations S1031 to S1033 (not depicted). In other words, the operation of determining, by the video processing device, a similarity degree between the text regions of the each video frame image in the adjacent video frame image includes operations S1031 to S1033, and the operations are separately described below.

In operation S1031, the system fuses the initial feature of the each video frame image in the adjacent video frame image and the text mask feature corresponding to the text region of the each video frame image in the adjacent video frame image into a key frame feature of each video frame image in the adjacent video frame image.

The text region of the each video frame image in the adjacent video frame image corresponds to a text mask feature. Therefore, the video processing device may obtain the text mask feature and fuse the obtained text mask feature with the initial feature.

In this embodiment, the video processing device weights the initial feature by using the text mask feature, and completes the fusion of the initial feature and the text mask feature, to highlight the feature of the video frame image used for determining a similarity degree with other video frame images in an aspect of text information, so that the determined similarity degree is a similarity degree based on the text information of the video frame image. An obtained fusion result herein is a key frame feature. The key frame feature is used for representing a feature that corresponds to the video frame image and is used for determining whether it is the video key frame of the video.

In operation S1032, the system obtains a feature difference between the key frame features of the each video frame image in the adjacent video frame image.

When the obtaining of the key frame feature corresponding to each video frame image in the adjacent video frame image is completed, the video processing device compares two key frame features corresponding to two adjacent video frame images in the adjacent video frame image, to obtain a feature difference between key frame features of each video frame image in the adjacent video frame image.

In operation S1033, the system determines a similarity degree between the text regions of the each video frame image in the adjacent video frame image according to the feature difference.

In this embodiment, because the feature difference represents a similarity between two adjacent video frame images to some extent, the video processing device may obtain a similarity between two adjacent video frame images in the adjacent video frame image according to the similarity degree represented by the feature difference. It is easily learned that, a larger value corresponding to the feature difference indicates that the two adjacent video frame images are less similar, and a smaller value corresponding to the feature difference indicates that the two adjacent video frame images are more similar.

Considering that the feature difference is insufficient to highlight the similarity between the two adjacent video frames, the video processing device may further optimize the feature difference, for example, optimize the feature difference by using at least one of a convolutional layer, "inception-A", a pooling layer (average pooling, maximum pooling, or random pooling), and a fully connected layer, and further use the optimized feature difference as a target feature difference for determining the similarity degree. If sizes of to-be-processed features are inconsistent, the sizes of the features may be adjusted to be consistent for further optimization.

Correspondingly, in operation S1033, the operation of determining, by the video processing device, a similarity degree between the text regions of the each video frame image in the adjacent video frame image according to the feature difference includes: determining, by the video processing device, the similarity degree between the text regions of the each video frame image in the adjacent video frame image according to the target feature difference.

Based on the above, because the similarity degree represents a possibility that the two adjacent video frame images are similar, a larger similarity degree indicates a lower possibility, and a smaller similarity degree indicates a higher possibility, the preset similarity degree set for the video processing device is used for determining whether the similarity degree indicates that two adjacent video frame images are similar. Therefore, the video processing device may determine that the video frame images whose similarity degrees are less than the preset similarity degrees in the corresponding adjacent video frame image are similar video frame images.

In this embodiment, operation S1022 may be implemented through operations S10221 and S10222 (not depicted). In other words, the operation of obtaining, by the video processing device, a text mask feature of the initial feature includes operations S10221 and S10222, and the operations are separately described below.

In operation S10221, the system determines a text weight value of the initial feature.

In this embodiment, the video processing device obtains a weight value of text information corresponding to the initial feature of each video frame image, to complete the obtaining of the text weight in the initial feature, and an obtained result is the text weight value. The text weight value herein represents an amount of the text information included in the initial feature to some extent, and the text weight value of the initial feature may be obtained by using preset parameter information (for example, $W_i$ and $b_i$ in Equation (1)).

For example, when the initial feature is a 256*14*14 feature map, the video processing device obtains a weight value corresponding to each 14*14 feature map by using Equation (1) and Equation (2) of an attention model, to obtain 256 weight values. Equation (1) and Equation (2) are shown as follows:

$$e_i = W_i \cdot f_i + b_i \quad (1)$$

and $$\alpha_i = \mathit{soft}\max(e_i) = \frac{e_i}{\sum_j e_j}. \quad (2)$$

where $f_i$ is an $i^{th}$ 14*14 feature map of the 256 14*14 feature maps, $W_i$ and $b_i$ are parameter information corresponding to $f_i$ that may be obtained through training in the attention model, and $e_i$ is text information of the $i^{th}$ 14*14 feature map; and j is a value ranging from 1 to 256, $$\sum_j e_j$$

is a sum of the text information of the 256 14*14 feature maps, and both a, and softmax($e_i$) are weight values corresponding to the $i^{th}$ 14*14 feature map. For ease of calculation, 14*14 may be pulled into a 196-dimensional vector to further participate in the calculation during calculation.

In operation S10222, the system obtains a text mask feature of the initial feature by using the text weight value.

After obtaining the text weight value, the video processing device performs feature extraction on the initial feature by using the text weight value, to obtain a text feature of the initial feature, and an obtained result is the text mask feature.

For example, referring to Equation (3), $$f_{attn} = \alpha_i f_i \quad (3).$$

where $f_{attn}$ is a text feature corresponding to the $i^{th}$ 14*14 feature map based on Equation (1) and Equation (2). A sum of 256 $f_{attn}$ is the text mask feature.

In this embodiment, operation S105 may be implemented through operations S1051 to S1054. In other words, the operation of determining, by the video processing device, a text key frame in the video based on the key video frame segment includes operations S1051 to S1054, and the operations are separately described below.

In operation S1051, the system combines the key video frame segment, to obtain a first subtext key frame.

In this embodiment, because video frame images of the key video frame segment are similar to each other, the video processing device selects any video frame from the key video frame segment, to obtain a first subtext key frame. The first subtext key frame herein is the text key frame in the video.

It may be understood that, the video processing device combines the key video frame segment and discards similar video frames, so that the video frames having different text information in the video are obtained.

In operation S1052, the system obtains key video frames of different texts according to video frame images whose single text inclusion values corresponding to the adjacent video frame image are greater than the preset inclusion value, and the adjacent video frame image corresponding to a similarity degree not less than a preset similarity degree.

In this embodiment, the text key frame in the video is alternatively derived from video frames corresponding to video frame images whose single text inclusion values corresponding to the adjacent video frame image are greater than the preset inclusion value, and a video frame corresponding to the adjacent video frame image whose similarity degree is not less than the preset similarity degree. Therefore, the video processing device combines the video frames corresponding to the video frame images whose single text inclusion values corresponding to the adjacent video frame image are greater than the preset inclusion value with the video frame corresponding to the adjacent video frame image whose similarity degree is not less than the preset similarity degree, to obtain the key video frames of different texts. If the adjacent video frame image herein has a corresponding similarity degree, it indicates that all the text inclusion values of the video frame images in the adjacent video frame image are greater than the preset inclusion value.

In operation S1053, the system removes a video frame the same as video frames in the key video frame segment from the key video frames of different texts, to obtain a second subtext key frame.

Considering that there is a same video frame between the key video frames of different texts and the key video frame segment, the video processing device removes the video frame the same as the video frames in the key video frame segment from the key video frames of different texts. In this case, key video frames of different texts from which the same video frame is removed are the second subtext key frame. It is easily learned that the second subtext key frame is also the text key frame in the video.

In operation S1054, the system combines the first subtext key frame and the second subtext key frame into the text key frame.

In this embodiment, after the video processing device obtains the first subtext key frame and the second subtext key frame, because both the first subtext key frame and the second subtext key frame are the text key frame in the video, the video processing device uses both the first subtext key frame and the second subtext key frame as the text key frame.

Figure 7B:
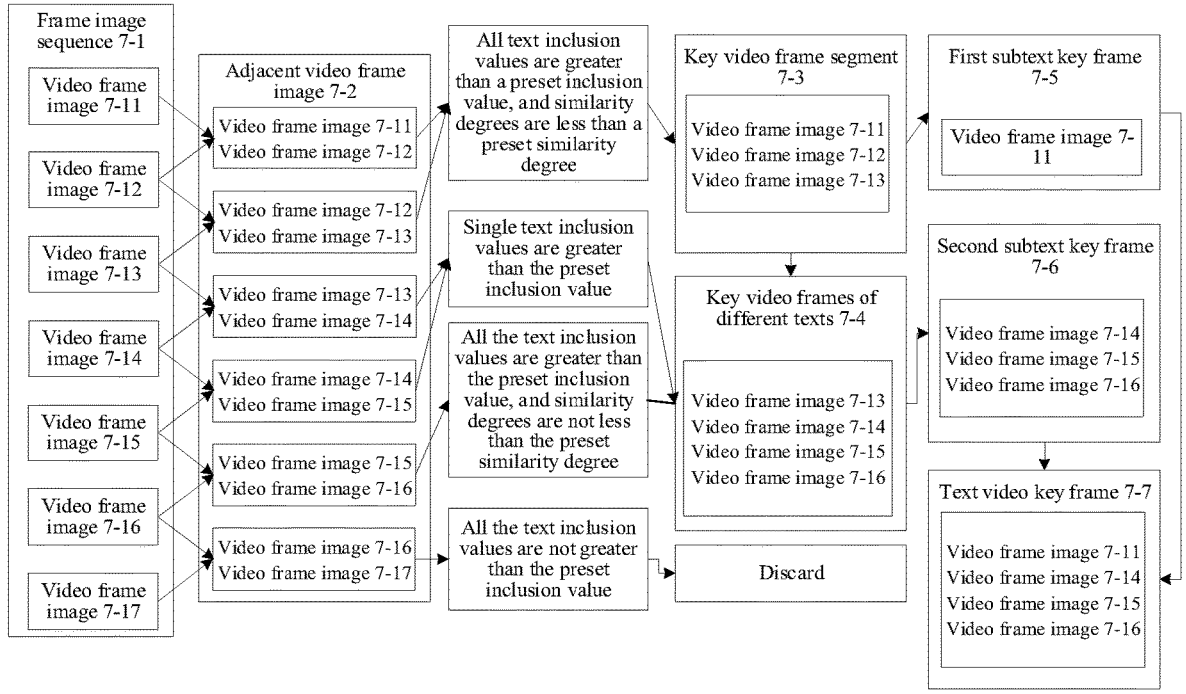
FIG. 7b is a flowchart of an example of obtaining a text key frame according to an embodiment.

FIG. 7*b* is a flowchart of an example of obtaining a text key frame according to an embodiment. As shown in FIG. 7*b*, a frame image sequence 7-1 corresponding to a video includes a video frame image 7-11, a video frame image 7-12, a video frame image 7-13, a video frame image 7-14, a video frame image 7-15, a video frame image 7-16, and a video frame image 7-17. Because in an adjacent video frame image 7-2, all text inclusion values of the video frame image 7-11, the video frame image 7-12, the video frame image 7-13, and the video frame image 7-14 are greater than a preset inclusion value, and similarity degrees are less than a preset similarity degree, a key video frame segment 7-3 including a video frame corresponding to the video frame image 7-11, a video frame corresponding to the video frame image 7-12, and a video frame corresponding to the video frame image 7-13 is obtained. Because in the adjacent video frame image 7-2, both text inclusion values of the video frame image 7-16 and the video frame image 7-17 are not greater than the preset inclusion value, it indicates that both the video frame image 7-16 and the video frame image 7-17 do not include a text, and are discarded. Because in the adjacent video frame image 7-2, single text inclusion values of the video frame image 7-13 and the video frame image 7-14, and the video frame image 7-14 and the video frame image 7-15 are greater than the preset inclusion value, both the text inclusion values of the video frame image 7-15 and the video frame image 7-16 are greater than the preset inclusion value, and similarity degrees are not less than the preset similarity degree, key video frames 7-4 of different texts including a video frame corresponding to the video frame image 7-13, a video frame corresponding to the video frame image 7-14, a video frame corresponding to the video frame image 7-15, and a video frame corresponding to the video frame image 7-16 are obtained.

The key video frame segment 7-3 is combined, to obtain a first subtext key frame 7-5 including the video frame corresponding to the video frame image 7-11. A video frame corresponding to the video frame image 7-13 the same as the video frames in the key video frame segment 7-3 is removed from the key video frames 7-4 of different texts, to obtain a second subtext key frame 7-6 including the video frame corresponding to the video frame image 7-14, the video frame corresponding to the video frame image 7-15, and the video frame corresponding to the video frame image 7-16.

Finally, the first subtext key frame 7-5 is combined with the second subtext key frame 7-6, to obtain a text video key frame 7-7 including the video frame corresponding to the video frame image 7-11, the video frame corresponding to the video frame image 7-14, the video frame corresponding to the video frame image 7-15, and the video frame corresponding to the video frame image 7-16.

In this embodiment, the video processing device may process a video according to the text key frame, to obtain processing information. In other words, processing the video is performed only for the video frame including the text information, for example, is performed by using a video OCR technology. Therefore, when obtaining a text key frame, the video processing device may process the video according to the text key frame, and an obtained processing result is processing information. In this case, the video processing device is a combination of the server 200 and the server 400.

Figure 8:
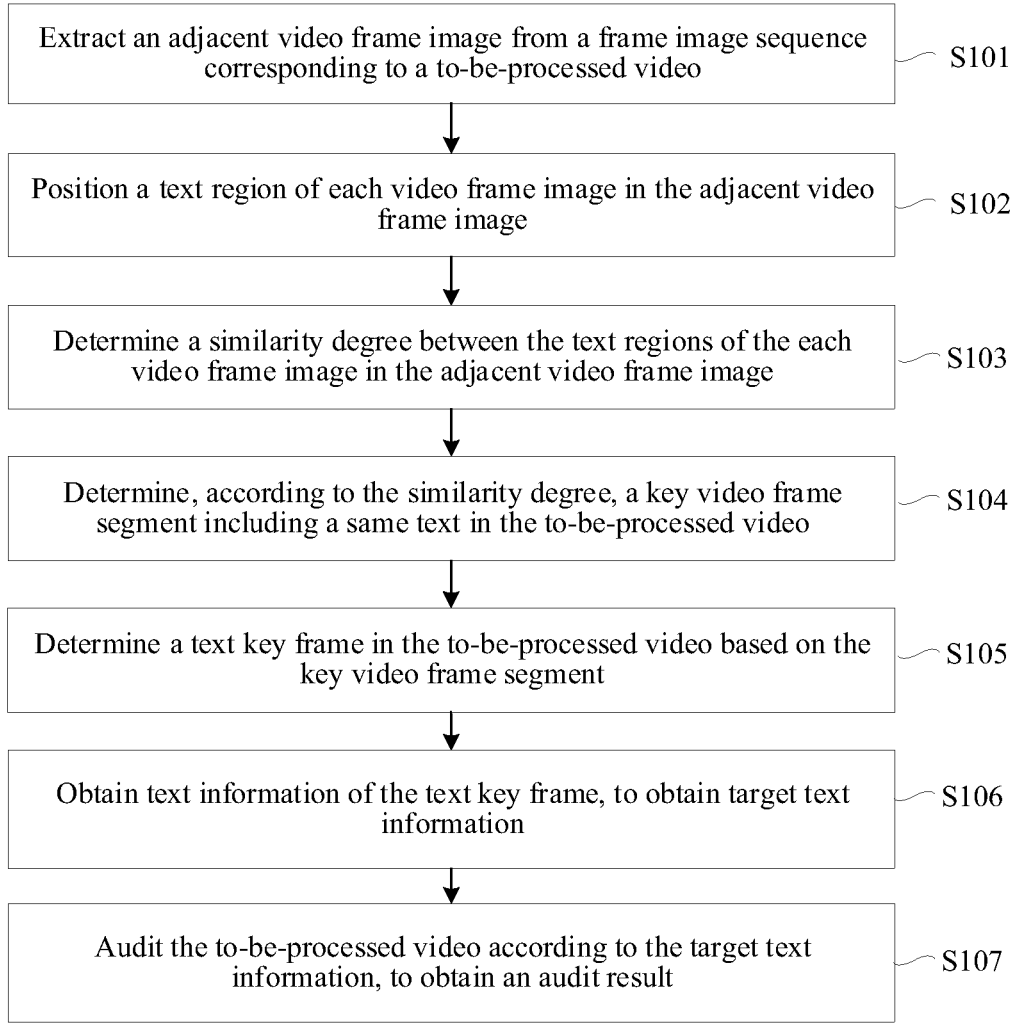
FIG. 8 is flowchart of a video processing method according to an embodiment.

FIG. 8 is flowchart of a video processing method according to an embodiment. As shown in FIG. 8, in this embodiment of this disclosure, operations S106 and S107 are further included after operation S105. In other words, after the determining, by the video processing device, a text key frame in the video based on the key video frame segment, the video processing method further includes operations S106 and S107. The description is made below with reference to operations shown in FIG. 8.

In operation S106, the system obtains text information of the text key frame, to obtain target text information.

In this embodiment, the video processing device obtains text information of the text key frame from the video frame images corresponding to the video frames, to obtain target text information. The target text information herein is a representation of information corresponding to the video in a text form.

In operation S107, the system audits the video according to the target text information, to obtain an audit result.

The target text information represents the information corresponding to the video. Therefore, the video processing device audits the target text information, that is, audits the video, to obtain an audit result (for example, the audit succeeds or fails).

In other words, after the video processing device obtains the text key frame, the text key frame may be applied to a text video audit system. That is, the video is audited by using the text in the video key frame of the video, to determine whether the video is a preset video (a video meeting requirements).

In this embodiment, operation S108 (not depicted) is further included after operation S105. In other words, after the determining, by the video processing device, a text key frame in the video based on the key video frame segment, the video processing method further includes operation S108, and the description is made below with reference to the operation.

In operation S108, the system transmits a text key frame to a display device, to display video information corresponding to the text key frame by using the display device.

After obtaining a text key frame, the video processing device transmits the text key frame to a display device, to display video information corresponding to the text key frame on the display device, and further determine, according to the displayed video information corresponding to the text key frame, information represented by the video. In this way, a user may quickly acquire main information of the video.

For example, if in a 10-second video, all subtitles displayed in first 1 to 6 seconds of the video are first subtitles, and all subtitles displayed in following 7 to 10 seconds of the video are second subtitles, by using the video processing method provided in the embodiments of this disclosure, a video frame may be selected from the first 1 to 6 seconds of the video and a the video may be selected from the following 7 to 10 seconds of the video, and the two video frames are used as a text key frame. In this case, when acquiring main content of the video, the user needs to spend 10 seconds in watching the video, but needs to spend 1 second or less time in watching the text key frame formed by the two video frames. In both cases, the main content of the video may be acquired, and therefore the efficiency of information acquisition is improved.

It may be understood that, the video processing device processes the text key frame by obtaining the text key frame of the video, instead of processing the video, thereby improving a video processing speed. In addition, because accuracy of the text key frame is high, accuracy of obtained processing information is also high.

In this embodiment, operations S102 and S103 may be implemented by using a network model. In other words, the positioning, by the video processing device, a text region of each video frame image in the adjacent video frame image, and determining a similarity degree between the text regions of the each video frame image in the adjacent video frame image includes: positioning, by the video processing device by using a preset key frame model, the text region of the each video frame image in the adjacent video frame image, and determining the similarity degree between the text regions of the each video frame image in the adjacent video frame image.

The video processing device may obtain the preset key frame model, for example, interact with other devices to obtain the preset key frame model from other devices, or obtain the preset key frame model from a storage apparatus of the video processing device. In addition, the preset key frame model is a pre-trained model configured to obtain text inclusion values of the video frame images in the adjacent video frame image and a similarity between the video frame images in the adjacent video frame image. Therefore, after obtaining the preset key frame model and an adjacent video frame image, the video processing device uses the adjacent video frame image as an input of the preset key frame model, may obtain a text region corresponding to each video frame image in the adjacent video frame image by using the preset key frame model (or measure whether a metric value including text information is a text inclusion value), and may obtain a similarity, that is, a similarity degree between two adjacent video frame images in the adjacent video frame image.

In this embodiment, the video processing device is intended to obtain video frame images having different texts in the video when obtaining the video key frame of the video. Therefore, the video processing device first obtains an overall feature, that is, an initial feature of the video frame images in the adjacent video frame image by using the preset key frame model, and detects a feature of a text position region of each video frame image in the adjacent video frame image from the initial feature, to obtain a text mask feature respectively corresponding to each video frame image in the adjacent video frame image, to obtain a text prediction region of the each video frame image. Further, the video processing device determines a text inclusion value respectively corresponding to the each video frame image in the adjacent video frame image by using the text mask feature respectively corresponding to the each video frame image in the adjacent video frame image, and performs similarity comparison between the video frame images of the adjacent video frame image with reference to a corresponding combination result of each initial feature and each text mask feature, to obtain a similarity degree between two adjacent video frame images.

In this embodiment of this disclosure, before the implementing, by the video processing device, operations S102 and S103 by using a network model, the video processing method further includes operations S109 to S112 (not depicted), and the operations are described below.

In operation S109, the system obtains a training sample. The training sample includes an adjacent sample video frame image, a text annotation region, and an annotation similarity degree.

In this embodiment, the video processing device may obtain a sample, that is, the training sample used for training to obtain a preset key frame model.

The training sample includes three parts: an adjacent sample video frame image, a text annotation region, and an annotation similarity degree. The adjacent sample video frame image is two adjacent video frame images in a sample video, and the sample video is used for training to obtain a video sample of the preset key frame model. The text annotation region is text information respectively corresponding to each sample video frame image in the adjacent sample video frame image. The annotation similarity degree is an actual similarity between the adjacent sample video frame images.

In operation S110, the system obtains a text prediction region of each sample video frame image in the adjacent sample video frame image and a prediction similarity degree between the text prediction regions of the each sample video frame image in the adjacent sample video frame image by using an original key frame model.

In this embodiment, the video processing device may obtain the original key frame model. The original key frame model is a pre-trained model used for predicting the text information corresponding to the each sample video frame image in the adjacent sample video frame image and the similarity between the text prediction regions of the each sample video frame image in the adjacent sample video frame image. The video processing device inputs the adjacent sample video frame image into the original key frame model, and predicts the text information, that is, the text prediction region of each adjacent sample video frame image in the adjacent sample video frame image and a metric value of the similarity, that is, predicts the prediction similarity degree between the sample video frame images in the adjacent sample video frame image by using the original key frame model.

The video processing device is intended to obtain video frames having different texts in the sample video when obtaining the video key frames of the sample video. Therefore, the video processing device first obtains an overall feature, that is, an initial prediction feature of the sample video frame images in the adjacent sample video frame image by using the original preset key frame model, and detects a feature of a text position region of each sample video frame image in the adjacent sample video frame image from the initial prediction feature, to obtain a text mask prediction feature respectively corresponding to each sample video frame image in the adjacent sample video frame image, to obtain a text region. Further, the computer device performs similarity comparison between the sample video frame images of the adjacent sample video frame image with reference to a corresponding combination result of each initial prediction feature and each text mask prediction feature, to obtain a prediction similarity degree between two adjacent sample video frame images.

The initial prediction feature herein is overall feature information of the sample video frame images. That is, the video processing device performs feature extraction on an entire region of the sample video frame images, to obtain the initial prediction feature.

In operation S111, the system obtains a loss function value based on a difference between the text prediction region of the each sample video frame image in the adjacent sample video frame image and the text annotation region, and a difference between the prediction similarity degree and the annotation similarity degree.

In this embodiment, to determine a prediction capability of the original key frame model, the video processing device obtains a difference between each text prediction region and the text annotation region and a difference between the prediction similarity degree and the annotation similarity degree by using a loss function, to obtain a loss function value used for training the original key frame model.

The loss function value includes two parts. One part is a loss function value of a text part, that is, a difference between each text prediction region and the text annotation region; and the loss function value of the text part further includes two subparts, and each subpart corresponds to a difference between a text prediction region of one sample video frame image and annotation region information corresponding to the text annotation region. The other part is a loss function value of a similarity part, that is, the difference between the prediction similarity degree and the annotation similarity degree.

For example, the loss function is shown in Equation (4):

$$L(x_1,x_2)=\alpha \cdot L_{text\_mask}(x_1)+\alpha \cdot L_{text\_mask}(x_2)+\beta \cdot L_{sim}(x_1,x_2) \quad (4)$$

where $x_1$ and $x_2$ are adjacent sample video frame images, $\alpha$ is a weight of a difference between the each text prediction region and text annotation region, $\beta$ is a weight of a difference between the prediction similarity degree and the annotation similarity degree; $L_{text\_mask}(x_1)$ is a difference between a text prediction region corresponding to $x_1$ in the adjacent sample video frame image and the text annotation region, $L_{text\_mask}(x_2)$ is a difference between a text prediction region corresponding to $x_2$ in the adjacent sample video frame image and the text annotation region; $L(x_1, x_2)$ is a loss function value; and $L_{sim}(x_1, x_2)$ is the difference between the prediction similarity degree and the annotation similarity degree.

Herein, if an L2 norm loss function is used for the difference between each text prediction region and the text annotation region; annotation region information of the text annotation region corresponding to $x_1$ is $y_1$, and a corresponding text prediction region is $\varphi(x1)$; annotation region information of the text annotation region corresponding to $x_2$ is y2, and a corresponding text prediction region is p(x2); and a prediction similarity degree between $x_1$ and $x_2$ is $p(x_1, x_2)$, and an annotation similarity degree is $y(x_1, x_2)$, a loss function shown in Equation (5) is obtained based on Equation (4).

$$L(x_1, x_2) = \alpha \cdot L_{text\_mask}(x_1) + \alpha \cdot L_{text\_mask}(x_2) + \beta \cdot L_{sim}(x_1, x_2) = \quad (5)$$
$$-\alpha \cdot [L_2(\varphi(x1) - y1)] - \alpha \cdot [L_2(\varphi(x2) - y2)]] -$$
$$\beta \cdot [y(x_1, x_2) \cdot \log(p(x_1, x_2)) + (1 - y(x_1, x_2)) \cdot \log(1 - p(x_1, x_2))].$$

In this embodiment, to train the similarity degree more effectively, the weight corresponding to the difference between the prediction similarity degree and the annotation similarity degree may be set to greater than the weight corresponding to the difference each text prediction region and the text annotation region. For example, in Equation (4) and Equation (5), a is set to 0.1, and β is set to 0.9.

In operation S112, the system continuously performs iterative training on the original key frame model by using the loss function value, until a preset training cut-off condition is met, to obtain the preset key frame model.

In this embodiment, the video processing device determines whether the loss function value meets the preset training cut-off condition after obtaining the loss function value, and adjusts parameters in the original key frame model, for example, $W_i$ and $b_i$ in Equation (1) by using the loss function value if not. In this case, one training process is completed. Then, the video processing device uses the adjusted original key frame model as a to-be-trained model in next training, predicts a similarity between text information of each sample video frame image in the adjacent sample video frame image and the adjacent sample video frame image, compares a prediction result with annotation information (the text annotation region and the annotation similarity degree), to obtain a new loss function value, and adjusts parameters in the adjusted original key frame model in a case that the new loss function value does not meet the preset training cut-off condition. In this way, iterative training is performed, until when an obtained loss function value is less than a preset threshold, it is determined that the preset training cut-off condition is met. In this case, the training is stopped, and a model obtained through current training is used as a preset key frame model, that is, the preset key frame model is an original key frame model completing training.

The preset training cut-off condition may be that the foregoing obtained loss function value is less than the preset threshold, or may be other determining conditions. The embodiments of this disclosure are not specifically limited thereto.

The model mentioned in this embodiment of this disclosure may be an artificial neural network model, or may be another neural network model. The embodiments of this disclosure are not specifically limited thereto.

In addition, in this embodiment of this disclosure, all parameters are set according to actual conditions when the video processing device performs training of the original key frame model. For example, during training of the original key frame model, the network is trained by using an "Adam" optimizer, an initial learning rate is set to 0.0005, and is reduced to 0.1 of the original learning rate every 30 "epoch" (one training corresponding to all samples), a size of a mini-batch is set to 128, and momentum and weight decay are respectively set to 0.9 and 0.0001.

After the preset key frame model is obtained, the preset key frame model may be evaluated. During evaluation, video evaluation is divided into difficulty levels, so that the accuracy of the preset key frame model is measured by using different difficulty levels.

For example, video evaluation includes three difficulty levels: "easy", "medium", and "hard". "Easy" indicates that subtitles appear in an upper or lower part of the video, and appear and disappear together. The subtitles are usually used for representing what a person in the video says. "Medium" indicates that usually many texts (or art words) appear in the video and represent content directly, for example, prostitution, and gambling results. The texts are not changed throughout the video or are changed once after a period of time. "Hard" indicates that texts in the video appear in a scrolling manner or one text (or word) appears.

In this case, if any video frame image in the video frame images including same text information in the evaluation video is used as a text key frame, a time period corresponding to the adjacent text key frame image is defined as a key frame segment, and if the predicted text key frame falls within the key frame segment, it is determined that the prediction is accurate. The accuracy of the preset key frame model is measured by using a recall rate and an accuracy rate; and a quantity of key frames that are detected in the same key frame segment is only recorded once. As shown in Equation (6) and Equation (7):

Recall rate=a quantity of key frames detected to be correct/a quantity of key frames annotated as a truth value (6)

Accuracy rate=a quantity of key frames detected to be correct/a total quantity of detected key frames (7)

Further, 1 frame is collected from 1 second of the video, in a case that there are 34 prediction video sets corresponding to datasets at an easy level, there are 27 prediction video sets corresponding to datasets at a medium level, and there are 29 prediction video sets corresponding to datasets at a hard level (where it is easily learned that there are total 100 datasets), evaluation results are shown in Table 1:

TABLE 1

| Dataset | Accuracy rate | Recall rate |
|---|---|---|
| Easy set (34) | 89.47% | 77.08% |
| Medium set (27) | 90.31% | 56.01% |
| Difficult set (29) | 84.49% | 26.12% |
| All | 88.19% | 44.96% |

It is easily learned that, the preset key frame model has a relatively high accuracy rate and recall rate.

In this embodiment, operation S113 (not depicted) is further included after operation S112. In other words, after the continuously performing, by the video processing device, iterative training on the original key frame model by using the loss function value, until a preset training cut-off condition is met, to obtain the preset key frame model, the video processing method further includes operation S113, and operation S113 is described below.

In operation S113, the system optimizes, in a case that a new training sample is obtained, the preset key frame model by using the new training sample.

When obtaining the preset key frame model, the video processing device may further optimize the preset key frame model by obtaining a new training sample, to improve a generalization capability of the preset key frame model.

In this embodiment of this disclosure, after obtaining the new training sample, the video processing device may optimize the preset key frame model based on the new training sample, to perform video processing by using the optimized preset key frame model. An optimization process herein is similar to the process of obtaining the preset key frame model through training, and details are not described in this embodiment of this disclosure again.

In the embodiments of this disclosure, the positioning, by the video processing device by using a preset key frame model, a text region of each video frame image in the adjacent video frame image, and determining a similarity degree between the text regions of the each video frame image in the adjacent video frame image includes: positioning, by using the optimized preset key frame model, the text region of the each video frame image in the adjacent video frame image and determining the similarity degree between the text regions of the each video frame image in the adjacent video frame image.

It may be understood that, the video processing device may improve the generalization capability of the optimized preset key frame model by continuously optimizing the preset key frame model, and further improve an effect of video processing when implementing the video processing based on the optimized preset key frame model.

The following describes an exemplary application of this embodiment of this disclosure in an actual application scenario.

Figure 9:
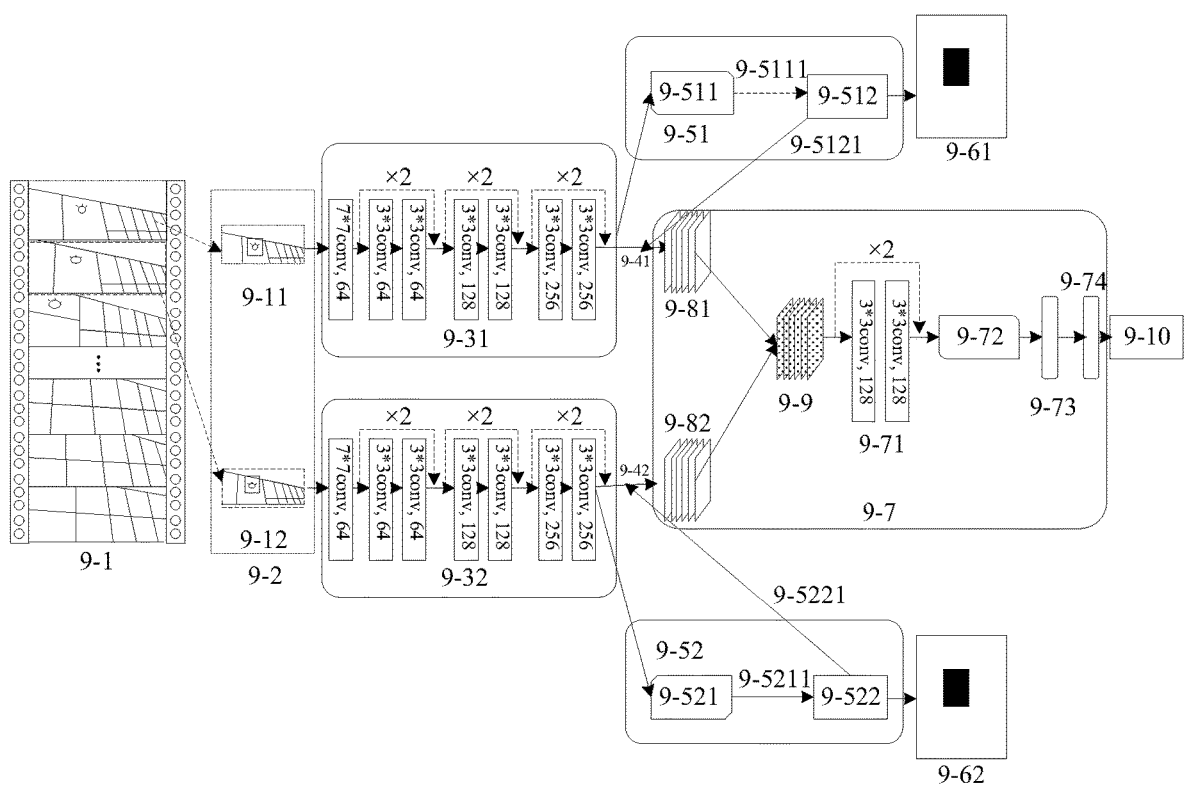
FIG. 9 is a diagram of an example of a video processing procedure according to an embodiment.

FIG. 9 is a diagram of an example of a video processing procedure according to an embodiment. As shown in FIG. 9, first, a first video frame image pair 9-2 of a video 9-1 is obtained, that is, an adjacent video frame image is obtained. The video frame image pair 9-2 includes a video frame image 9-11 and a video frame image 9-12. The video frame image 9-11 in the video frame image pair 9-2 is inputted into a network 9-31 before a $(4\_2)^{th}$ convolutional layer of a "ResNet" residual network to obtain a feature 9-41 (an initial feature) of the video frame image 9-11, and the video frame image 9-12 in the video frame image pair 9-2 is inputted into a network 9-32 before a $(4\_2)^{th}$ convolutional layer of another "ResNet" residual network to obtain a feature 9-42 (an initial feature) of the video frame image 9-12.

Then, the feature 9-41 is inputted into a network 9-51 and is first processed through an attention part 9-511, to obtain a weight value 9-5111 (a text weight value). The feature 9-41 is then processed through a text mask region part 9-512, and the weight value 9-5111 is fused with the feature 9-41, to obtain a text mask region 9-5121 (a text mask feature). Further, a text region 9-61 (or a text inclusion value) corresponding to the video frame 9-11 is determined according to the text mask region 9-5121. Similarly, the feature 9-42 is inputted into a network 9-52 and is first processed through an attention part 9-521, to obtain a weight value 9-5211 (a text weight value). The feature 9-42 is then processed through a mask text region part 9-522, and the weight value 9-5211 is fused with the feature 9-42, to obtain a text mask region 9-5221 (a text mask feature). Further, a text region 9-62 (or a text inclusion value) corresponding to the video frame 9-12 is determined according to the text mask region 9-5221.

Finally, the feature 9-41 and the text mask region 9-5121 are first weighted by using a similarity degree model 9-7, to obtain a key frame feature 9-81; similarly, the feature 9-42 and the text mask region 9-5221 are weighted, to obtain a key frame feature 9-82; and absolute values of the key frame feature 9-81 and the key frame feature 9-82 are then subtracted, to obtain a video frame difference feature 9-9 (a feature difference). To generate a more effective video frame difference feature, the video frame difference feature 9-9 is processed through two convolutional layers 9-71, an optimization part 9-72 corresponding to an "Inception-A" module, an average pooling layer 9-73, and a fully connected layer 9-74, to obtain a similarity degree 9-10.

Then, each video frame image of the video is continuously processed by using the foregoing process until a last video frame image pair of the video is processed, so that a similarity degree respectively corresponding to each video frame image pair included in the video 9-1 and a text region respectively corresponding to each video frame image included in the video 9-1 are obtained, and a text key frame is determined according to the obtained each text regions and the obtained each similarity degree.

The following further describes an exemplary structure of the video processing apparatus 455 provided in the embodiments of this disclosure that is implemented as a software part. In some embodiments, as shown in FIG. 6, a software part in the video processing apparatus 455 stored in the memory 450 may include: an extraction part 4551, configured to extract an adjacent video frame image from a frame image sequence corresponding to a video; a positioning part 4552, configured to position a text region of each video frame image in the adjacent video frame image; a similarity degree part 4553, configured to determine a similarity degree between the text regions of the each video frame image in the adjacent video frame image; and a key frame part 4554, configured to determine, according to the similarity degree, a key video frame segment including a same text in the video frame image, the key frame part 4554 being further configured to determine a text key frame in the video based on the key video frame segment.

In this embodiment of this disclosure, the extraction part 4551 is further configured to: decode the video, to obtain the frame image sequence; and obtain a current video frame image and a next video frame image in the frame image sequence, to obtain the adjacent video frame image.

In this embodiment of this disclosure, the positioning part 4552 is further configured to: obtain an initial feature of each video frame image in the adjacent video frame image; obtain a text mask feature of the initial feature; calculate a text inclusion value of each video frame image in the adjacent video frame image according to the text mask feature; and determine the text region of the each video frame image in the adjacent video frame image according to the text mask feature in a case that all the text inclusion values corresponding to the adjacent video frame image are greater than a preset inclusion value.

In this embodiments of this disclosure, the similarity degree part 4553 is further configured to: fuse the initial feature of the each video frame image in the adjacent video frame image and the text mask feature corresponding to the text region of the each video frame image in the adjacent video frame image into a key frame feature of each video frame image in the adjacent video frame image; obtain a feature difference between the key frame features of the each video frame image in the adjacent video frame image; and determine the similarity degree between the text regions of the each video frame image in the adjacent video frame image according to the feature difference.

In this embodiment of this disclosure, the similarity degree part 4553 is further configured to: determine a text weight value of the initial feature; and obtain the text mask feature of the initial feature by using the text weight value.

In this embodiment of this disclosure, the key frame part 4554 is further configured to: combine the key video frame segment, to obtain a first subtext key frame; obtain key video frames of different texts according to video frame images whose single text inclusion values corresponding to the adjacent video frame image are greater than the preset inclusion value, and the adjacent video frame image corresponding to the similarity degree not less than a preset similarity degree; remove a video frame the same as video frames in the key video frame segment from the key video frames of different texts, to obtain a second subtext key frame; and combine the first subtext key frame and the second subtext key frame into the text key frame.

In this embodiment of this disclosure, the video processing apparatus 455 further includes a processing part 4555, configured to: obtain text information of the text key frame, to obtain target text information; and audit the video according to the target text information, to obtain an audit result.

In this embodiment of this disclosure, the processing part 4555 is further configured to transmit the text key frame to a display device, to display video information corresponding to the text key frame by using the display device.

In this embodiments of this disclosure, the positioning part 4552 and the similarity degree part 4553 are further configured to: position, by using a preset key frame model, the text region of the each video frame image in the adjacent video frame image, and determine the similarity degree between the text regions of the each video frame image in the adjacent video frame image.

In this embodiment of this disclosure, the video processing apparatus 455 further includes a training part 4556, configured to: obtain a training sample, the training sample including an adjacent sample video frame image, a text annotation region, and an annotation similarity degree; obtain a text prediction region of each sample video frame image in the adjacent sample video frame image and a prediction similarity degree between the text prediction regions of the each sample video frame image in the adjacent sample video frame image by using an original key frame model; obtain a loss function value based on a difference between the text prediction region of the each sample video frame image in the adjacent sample video frame image and the text annotation region, and a difference between the prediction similarity degree and the annotation similarity degree; and continuously perform iterative training on the original key frame model by using the loss function value, until a preset training cut-off condition is met, to obtain the preset key frame model.

In this embodiment of this disclosure, the video processing apparatus 455 further includes an optimization part 4557, configured to optimize, in a case that a new training sample is obtained, the preset key frame model by using the new training sample.

In this embodiment of this disclosure, the positioning part 4552 and the similarity degree part 4553 are further configured to: position, by using an optimized preset key frame model, the text region of the each video frame image in the adjacent video frame image, and determine the similarity degree between the text regions of the each video frame image in the adjacent video frame image.

An embodiment of this disclosure provides a computer-readable storage medium storing executable instructions, the executable instructions, when executed by a processor, causing the processor to perform the video processing method provided in the embodiments of this disclosure, for example, the video processing method shown in FIG. 7a.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a compact disc (CD) ROM (CD-ROM), or may be any device including one of or any combination of the foregoing memories.

In some embodiments, the executable instructions may be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions may be deployed for execution on one computing device, execution on a plurality of computing devices located at one location, or execution on a plurality of computing devices that are distributed at a plurality of locations and that are interconnected through a communication network.

Based on the above, in this embodiment of this disclosure, because a similarity degree of the adjacent video frame used for determining the text key frame is obtained with reference to the text regions of the video frames, the similarity degree reflects a similarity of the adjacent video frame on text information, and further, video key frames having different text information may be then accurately obtained with reference to the similarity degree and the text regions. As a result, a repetition rate of text information in the extracted text key frame is relatively low, but accuracy of the text key frame is relatively high, thereby improving accuracy of the video key frames.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

What is claimed is:

1. A video processing method, performed by at least one processor, the method comprising:
   extracting at least two adjacent video frame images from a frame image sequence corresponding to a video;
   positioning a text region of each video frame image in the at least two adjacent video frame images, wherein the positioning the text region of each video frame image in the at least two adjacent video frame images comprises positioning, by using a preset key frame model, the text region of each video frame image in the at least two adjacent video frame images, wherein the preset key frame model is obtained by:
      obtaining a training sample, the training sample comprising an adjacent sample video frame image, a text annotation region, and a degree of annotation similarity;
      obtaining a text prediction region of each sample video frame image in the at least two adjacent video frame images and a degree of prediction similarity between text prediction regions of each sample video frame image in the at least two adjacent video frame images based on an original key frame model;
      obtaining a loss function value based on:
         a first difference between the text prediction region of each sample video frame image in the at least two adjacent video frame images and the text annotation region, and
         a second difference between the degree of prediction similarity and the degree of annotation similarity; and
      obtaining the preset key frame model by continuously performing iterative training on the original key frame model based on the loss function value, until a preset training cut-off condition is met;
   determining a degree of similarity between text regions of each video frame image in the at least two adjacent video frame images;
   determining, based on the degree of similarity, a key video frame segment comprising a same text in the video;
   determining a text key frame in the video based on the key video frame segment; and
   after the determining the text key frame in the video based on the key video frame segment, transmitting the text key frame to a display device, to display video information corresponding to the text key frame by using the display device.

2. The method of claim 1, wherein the extracting the at least two adjacent video frame images comprises:
   obtaining the frame image sequence by decoding the video; and
   obtaining the at least two adjacent video frame images by obtaining a current video frame image and a subsequent video frame image in the frame image sequence.

3. The method of claim 1, wherein, after the determining the text key frame in the video based on the key video frame segment, the method further comprises:
   obtaining target text information by obtaining text information of the text key frame; and
   obtaining an audit result by auditing the video based on the target text information.

4. The method of claim 1, wherein, after the continuously performing iterative training on the original key frame model by using the loss function value, the method further comprises:
   optimizing, based on a new training sample being obtained, the preset key frame model using the new training sample;
   wherein the positioning the text region of each video frame image in the at least two adjacent video frame images further comprises positioning, by using the optimized preset key frame model, the text region of each video frame image in the at least two adjacent video frame images; and
   wherein the determining the degree of similarity between the text regions of each video frame image in the at least two adjacent video frame images by using the preset key frame model further comprises determining the degree of similarity between the text regions of each video frame image in the at least two adjacent video frame images.

5. The method of claim 1, further comprising:
extracting another at least two adjacent video frame images from the frame image sequence corresponding to the video;
calculating a text inclusion value of each video frame image in the another at least two adjacent video frame images, the text inclusion value indicating whether the corresponding video frame image includes text;
determining that the text inclusion value of each video frame image in the another at least two adjacent video frame images each does not meet a preset inclusion value; and
in response to determining that the text inclusion value of each video frame image in the another at least two adjacent video frame images each does not meet the preset inclusion value, discarding the another at least two adjacent video frame images from key video frame segment processing.

6. The method of claim 1, wherein the positioning the text region of each video frame image in the at least two adjacent video frame images further comprises:
obtaining an initial feature of each video frame image in the at least two adjacent video frame images;
obtaining a text mask feature of the initial feature;
calculating a text inclusion value of each video frame image in the at least two adjacent video frame images based on the text mask feature; and
determining the text region of each video frame image in the at least two adjacent video frame images based on all text inclusion values corresponding to the at least two adjacent video frame images are greater than a preset inclusion value.

7. The method of claim 6, wherein the determining the degree of similarity comprises:
fusing the initial feature of each video frame image in the at least two adjacent video frame images and the text mask feature corresponding to the text region of each video frame image in the at least two adjacent video frame images into a key frame feature of each video frame image in the at least two adjacent video frame images;
obtaining a feature difference between key frame features of each video frame image in the at least two adjacent video frame images; and
determining the degree of similarity between the text regions of each video frame image in the at least two adjacent video frame images based on the feature difference.

8. The method of claim 6, wherein the obtaining the text mask feature of the initial feature comprises:
determining a text weight value of the initial feature; and
obtaining the text mask feature of the initial feature based on the text weight value.

9. An apparatus, comprising:
at least one memory configured to store computer program code; and
at least one processor configured to access said computer program code and operate as instructed by said computer program code, thereby causing the apparatus to:
extract at least two adjacent video frame images from a frame image sequence corresponding to a video;
position a text region of each video frame image in the at least two adjacent video frame images, wherein the positioning the text region of each video frame image in the at least two adjacent video frame images comprises positioning, by using a preset key frame model, the text region of each video frame image in the at least two adjacent video frame images, wherein the preset key frame model is obtained by:
obtaining a training sample, the training sample comprising an adjacent sample video frame image, a text annotation region, and a degree of annotation similarity;
obtaining a text prediction region of each sample video frame image in the at least two adjacent video frame images and a degree of prediction similarity between text prediction regions of each sample video frame image in the at least two adjacent video frame images based on an original key frame model;
obtaining a loss function value based on:
a first difference between the text prediction region of each sample video frame image in the at least two adjacent video frame images and the text annotation region, and
a second difference between the degree of prediction similarity and the degree of annotation similarity; and
obtaining the preset key frame model by continuously performing iterative training on the original key frame model based on the loss function value, until a preset training cut-off condition is met;
determine a degree of similarity between text regions of each video frame image in the at least two adjacent video frame images;
determine, based on the degree of similarity, a key video frame segment comprising a same text in the video;
determine a text key frame in the video based on the key video frame segment; and
after the determining the text key frame in the video based on the key video frame segment, transmit the text key frame to a display device, to display video information corresponding to the text key frame by using the display device.

10. The apparatus of claim 9, wherein the apparatus is further caused to:
obtain the frame image sequence by decoding the video; and
obtain the at least two adjacent video frame images by obtaining a current video frame image and a subsequent video frame image in the frame image sequence.

11. The apparatus of claim 9, wherein the apparatus is further caused to:
obtain an initial feature of each video frame image in the at least two adjacent video frame images;
obtain a text mask feature of the initial feature;
calculate a text inclusion value of each video frame image in the at least two adjacent video frame images based on the text mask feature; and
determine the text region of each video frame image in the at least two adjacent video frame images based on all text inclusion values corresponding to the at least two adjacent video frame images are greater than a preset inclusion value.

12. The apparatus of claim 11, wherein the apparatus is further caused to:
fuse the initial feature of each video frame image in the at least two adjacent video frame images and the text mask feature corresponding to the text region of each video frame image in the at least two adjacent video frame images into a key frame feature of each video frame image in the at least two adjacent video frame images;

obtain a feature difference between key frame features of each video frame image in the at least two adjacent video frame images; and determine the degree of similarity between the text regions of each video frame image in the at least two adjacent video frame images based on the feature difference.

13. The apparatus of claim 11, wherein the obtaining the text mask feature of the initial feature comprises:

determining a text weight value of the initial feature; and obtaining the text mask feature of the initial feature based on the text weight value.

14. The apparatus of claim 9, wherein the apparatus is further caused to:

obtain target text information by obtaining text information of the text key frame; and obtain an audit result by auditing the video based on the target text information.

15. A non-transitory computer-readable storage medium storing computer instructions that, when executed by at least one processor, cause a video processing computing device to:

extract at least two adjacent video frame images from a frame image sequence corresponding to a video;

position a text region of each video frame image in the at least two adjacent video frame images, wherein the positioning the text region of each video frame image in the at least two adjacent video frame images comprises positioning, by using a preset key frame model, the text region of each video frame image in the at least two adjacent video frame images, wherein the preset key frame model is obtained by:

obtaining a training sample, the training sample comprising an adjacent sample video frame image, a text annotation region, and a degree of annotation similarity;

obtaining a text prediction region of each sample video frame image in the at least two adjacent video frame images and a degree of prediction similarity between text prediction regions of each sample video frame image in the at least two adjacent video frame images based on an original key frame model;

obtaining a loss function value based on:

a first difference between the text prediction region of each sample video frame image in the at least two adjacent video frame images and the text annotation region, and a second difference between the degree of prediction similarity and the degree of annotation similarity; and obtaining the preset key frame model by continuously performing iterative training on the original key frame model based on the loss function value, until a preset training cut-off condition is met;

determine a degree of similarity between text regions of each video frame image in the at least two adjacent video frame images;

determine, based on the degree of similarity, a key video frame segment comprising a same text in the video;

determine a text key frame in the video based on the key video frame segment; and after the determining the text key frame in the video based on the key video frame segment, transmit the text key frame to a display device, to display video information corresponding to the text key frame by using the display device.

* * * * *